(12) United States Patent
Menichilli et al.

(10) Patent No.: US 8,682,757 B2
(45) Date of Patent: Mar. 25, 2014

(54) METHOD AND APPARATUS FOR PROCESSING FINANCIAL TRANSACTIONS SUBJECT TO DIFFERENT FINANCING TERMS

(75) Inventors: Julia Menichilli, New York, NY (US); Marq Williams, New York, NY (US); Marla Flatbush, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 2175 days.

(21) Appl. No.: 10/925,614

(22) Filed: Aug. 25, 2004

(65) Prior Publication Data

US 2007/0192235 A1    Aug. 16, 2007

(51) Int. Cl.
G06Q 40/00    (2012.01)

(52) U.S. Cl.
USPC .................................. 705/35; 705/36; 705/40

(58) Field of Classification Search
USPC ........................................................... 705/35
See application file for complete search history.

(56) References Cited

U.S. PATENT DOCUMENTS

| | | | |
|---|---|---|---|
| 5,297,026 A * | 3/1994 | Hoffman | 705/14.18 |
| 5,933,817 A * | 8/1999 | Hucal | 705/39 |
| 6,018,718 A * | 1/2000 | Walker et al. | 705/14.17 |
| 6,070,141 A * | 5/2000 | Houvener et al. | 705/76 |
| 6,332,134 B1 * | 12/2001 | Foster | 705/36 R |
| 6,618,705 B1 * | 9/2003 | Wang et al. | 705/26.44 |
| 6,681,988 B2 * | 1/2004 | Stack et al. | 235/380 |
| 6,999,943 B1 * | 2/2006 | Johnson et al. | 705/39 |
| 7,010,507 B1 * | 3/2006 | Anderson et al. | 705/31 |
| 7,072,858 B1 * | 7/2006 | Litzow et al. | 705/7.35 |
| 7,653,597 B1 * | 1/2010 | Stevanovski et al. | 705/40 |
| 7,765,124 B2 * | 7/2010 | Postrel | 705/14.3 |
| 2002/0120513 A1 * | 8/2002 | Webb et al. | 705/14 |
| 2003/0023549 A1 * | 1/2003 | Armes et al. | 705/40 |
| 2003/0074290 A1 * | 4/2003 | Clore | 705/35 |
| 2003/0097270 A1 * | 5/2003 | Musselwhite et al. | 705/1 |

(Continued)

OTHER PUBLICATIONS

"The 6 Month LIBOR Mortgage Loan", Feb. 5, 2004, http://www.homefinance4you.com/LIBOR.html.*

(Continued)

Primary Examiner — Gregory Johnson
(74) Attorney, Agent, or Firm — Snell & Wilmer L.L.P.

(57) ABSTRACT

A financial payment vehicle, such as a charge or credit card, provides lower financing terms on purchases that meet specified criteria (i.e. a minimum threshold transaction amount, a purchase from a particular industry or at particular merchants, and/or other enrollment qualifications) and further provides standard financing terms for purchases that do not meet the criteria.

23 Claims, 3 Drawing Sheets

(56) References Cited

U.S. PATENT DOCUMENTS

| | | | |
|---|---|---|---|
| 2003/0158818 A1* | 8/2003 | George et al. | 705/64 |
| 2003/0187796 A1* | 10/2003 | Swift et al. | 705/45 |
| 2003/0204421 A1* | 10/2003 | Houle et al. | 705/4 |
| 2003/0220863 A1* | 11/2003 | Holm et al. | 705/37 |
| 2003/0229585 A1* | 12/2003 | Butler | 705/39 |
| 2004/0024707 A1* | 2/2004 | Perre et al. | 705/42 |
| 2004/0049452 A1* | 3/2004 | Blagg | 705/39 |
| 2004/0117300 A1* | 6/2004 | Jones et al. | 705/39 |
| 2004/0162778 A1* | 8/2004 | Kramer et al. | 705/40 |
| 2004/0210531 A1* | 10/2004 | Barron et al. | 705/44 |
| 2004/0215556 A1* | 10/2004 | Merkley et al. | 705/38 |
| 2005/0209938 A1* | 9/2005 | Czyzewski et al. | 705/30 |
| 2006/0053056 A1* | 3/2006 | Alspach-Goss et al. | 705/14 |
| 2006/0178986 A1* | 8/2006 | Giordano et al. | 705/40 |
| 2007/0192235 A1* | 8/2007 | Menichilli et al. | 705/38 |
| 2010/0153199 A1* | 6/2010 | Ahmad | 705/14.17 |

OTHER PUBLICATIONS

Coffey, Laura T., "Is trumpeted zero percent financing a good deal?", May 20, 2001, St. Petersburg Times, p. 3.H.*

"No-Interest Financing Can Cost You Plenty", Jul. 9, 2000, http://www.oag.state.md.us/consumer/tip54.htm.*

"The 6 Month LIBOR Mortgage Loan", 21512004, http://www.homefinance4you.com/LIBOR.html.*

Coffey, Laura T., "Is trumpeted zero percent financing a good dear?", May 20, 2001, St. Petersburg Times, p. 3.H.*

* cited by examiner

METHOD AND APPARATUS FOR PROCESSING FINANCIAL TRANSACTIONS SUBJECT TO DIFFERENT FINANCING TERMS

FIELD OF THE INVENTION

This invention generally relates to automated electrical financial processes, and in particular it relates to funds transfers and credit transactions.

BACKGROUND OF THE INVENTION

Consumer credit transactions account for a large portion of revenues for credit providers and other financial institutions. Most consumer transactions fall within the same general range of transaction amounts, and are typically less than $1000.00. This is because most consumers are largely dissuaded from entering into larger purchases using their credit cards due to the standard financing terms applied to purchases, which typically include interest charges on outstanding balances at an annual percentage rate (APR) in the range of 1% to 25%, compounded monthly.

There is presently little opportunity for ordinary customers to receive reduced financing terms on their credit cards. Some credit card providers offer incentives to adopt their credit card to new customers only, in which a lower APR may be charged for all purchases for an introductory period of time only. However, this opportunity is not provided to existing customers, and a higher APR is automatically applied after the introductory period regardless of the customer's payment or credit history.

In order to receive reduced credit financing at select locations only, customers could adopt certain "house credit cards," i.e. merchant-specific credit cards, which typically offer reduced financing terms (when compared to the standard terms above) for purchases made using the house card. However, the usefulness of such merchant-specific cards is extremely limited, since they can not be used at other merchants or establishments. Thus, in order to receive reduced credit financing at various locations, many house cards would have to be obtained by a customer. Also, the vast majority of merchants in the U.S. marketplace do not offer house cards. Therefore, there is no opportunity for a customer to receive reduced credit financing for transactions involving such merchants.

Some prior credit programs have sought to introduce reduced financial terms to select purchases, but only if merchants performed additional steps in completing such transactions. Many merchants were dissuaded from entering these types of credit programs because of the additional processing required.

Credit providers receive their revenue from transaction fees that are largely based on purchase amounts, and so would benefit from additional revenue that could be obtained by offering incentives to customers to enter into larger credit transactions. Accordingly, there is a need for a method and apparatus for processing financial transactions subject to different financing terms that addresses certain problems with existing technologies.

SUMMARY OF THE INVENTION

It is an object of the present disclosure, therefore, to introduce a method and apparatus for processing financial transactions, such as credit card purchases, that are subject to differing financial terms. In one aspect of the disclosure, a credit provider processes standard financial transactions according to standard financial terms and establishes a credit financing program in which qualified financial transactions made by qualified purchasers are financed at reduced financial terms. Transactions may be qualified for reduced financing, such as same-as-cash financing, based on an amount of the financial transaction, an enrollment status of the merchant in the credit program now disclosed, and an enrollment status of the purchaser in the credit program now disclosed.

The credit provider may enroll a plurality of merchants for the credit financing program introduced herein, whereby the merchants may not be required to process qualified financial transactions in any special manner. Merchants may be selected based on an associated industry code, or a type of product or service offered by the merchant, or merchants may request enrollment.

The credit provider may further enroll a plurality of qualified purchasers for the credit financing program, based on, for example, their credit history. Purchasers may enroll for the credit financing program in any standard manner (for example, by calling, e-mailing, or otherwise communicating with the credit provider) and subsequently be notified of merchants, or the like, where qualified purchases may be initiated. In certain embodiments, the purchasers may pay a one-time or a recurring fee to become enrolled and/or stay enrolled in the credit program. In further embodiments, the enrollment in the credit program may be co-extensive with other known credit rewards programs (such as airline mile reward programs) offered by a credit provider. Alternatively, participation in the credit program introduced herein may be conditioned on foregoing other reward program points for qualified transactions.

The credit provider may approve both standard financial transactions and qualified financial transactions in the same manner. Such approval may be transmitted directly to merchants over any known or contemplated financial transaction network, or may be authorized indirectly through third party payment processors. In addition, merchants may process both standard financial transactions and qualified financial transactions in the exact same manner. Likewise, the credit provider provides payments to the merchant in the same manner for both standard and qualified financial transactions.

At the end of each invoicing period, the credit provider generates a billing statement for each purchaser having an account. The billing statement may include all standard financial transactions and any qualified financial transactions entered into by the purchaser, with the standard financial transactions subject to the standard financing terms and any qualified transaction charged according to the reduced financing terms. The reduced financing charges may be conditioned upon complete repayment of the amount of the financial transaction within a set period of time, which may typically be longer than one standard invoicing period and which may be selectable by the purchaser in certain embodiments. Failure to meet the repayment condition may result in the purchaser being retroactively assessed the amount due under standard financing terms, additional penalties or the like.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

A credit program for a transaction payment vehicle as introduced herein allows for reduced financing terms to be applied to qualified purchases at a variety of different enrolled merchants, while applying standard (i.e. typical charge or credit card repayment) terms for all other purchases. This solution allows for a participating, qualified customer to use a single card to get reduced financing on certain purchases from a variety of participating merchants while allowing use of the card at other non-participating merchants in a standard manner. Although the payment vehicle will be referenced herein in terms of a charge or credit card with universal or broad acceptance, such as those offered by AMERICAN EXPRESS, it should be readily apparent that the processes introduced herein can be adapted for use with a wide variety of known payment vehicles (such as radio-frequency identification (RFID) transponders, smart cards, debit cards, convenience checks, online or other electronic payment authorizations, or any similar mechanisms or processes that relay account details for accomplishing a payment from an account) and for any type of account, including, but not limited to: any variety of bank accounts, credit card accounts, charge card accounts, letters of credit, home equity loans, or the like.

In various embodiments, the payment vehicle and associated processes introduced herein will provide customers with the ability to use the same payment vehicle at a variety of merchants and qualify for reduced, or even "same-as-cash" (i.e., 0% APR) financing on qualified transactions. Additionally, when a purchase does not qualify for financing, the purchase will automatically be treated as a standard transaction by the credit provider. Customers will automatically be billed for standard and qualified purchases according to standard and reduced financing terms, respectively, and may be billed separately for both or on the same billing statement. Participating or enrolled merchants will not experience any change in the way they process credit transactions using the payment vehicle, whether or not such transactions are qualified.

Figure 1:
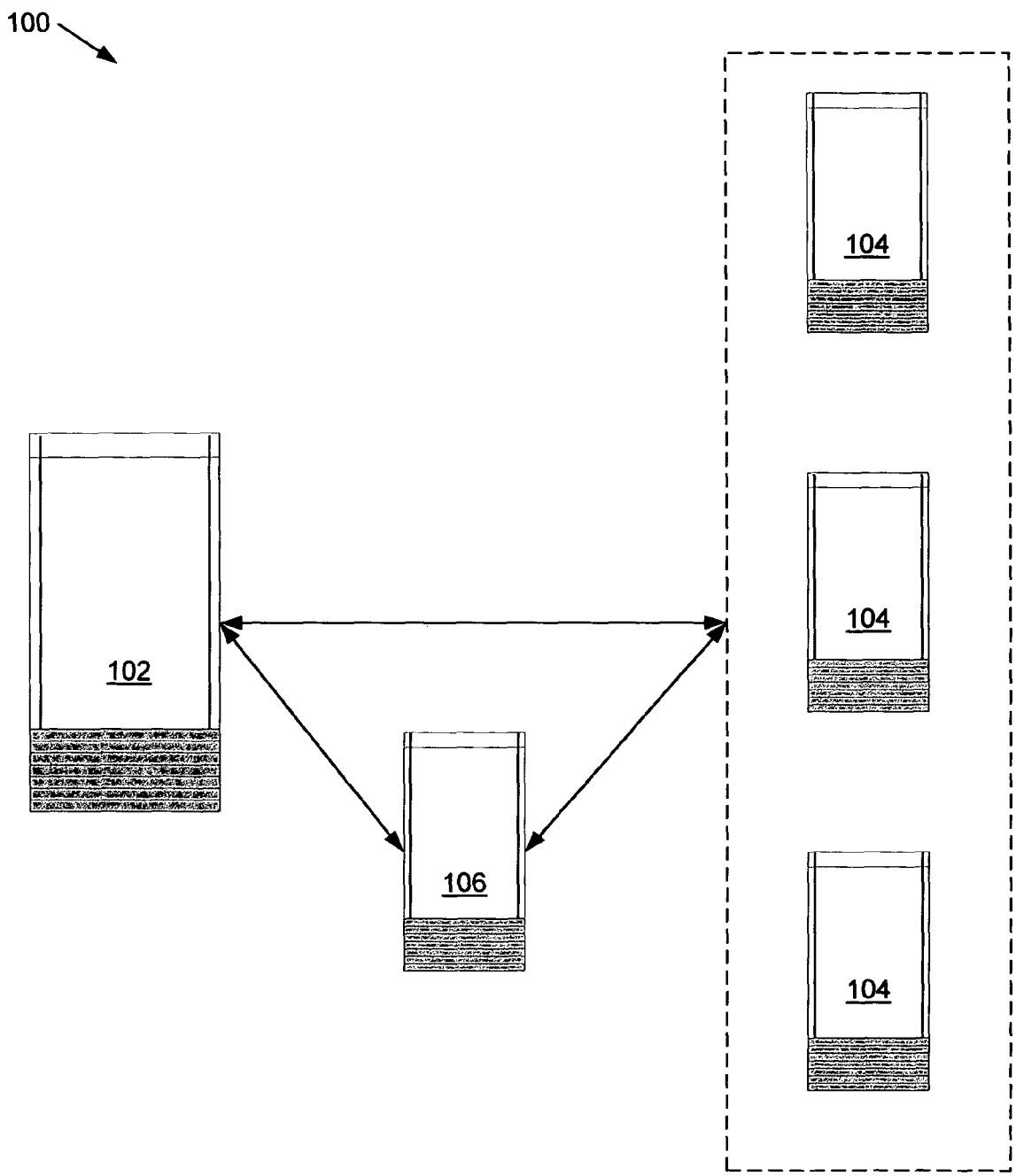
FIG. 1 is a block diagram of an exemplary financial transaction processing network according to certain embodiments of the present disclosure.
Figure 2:
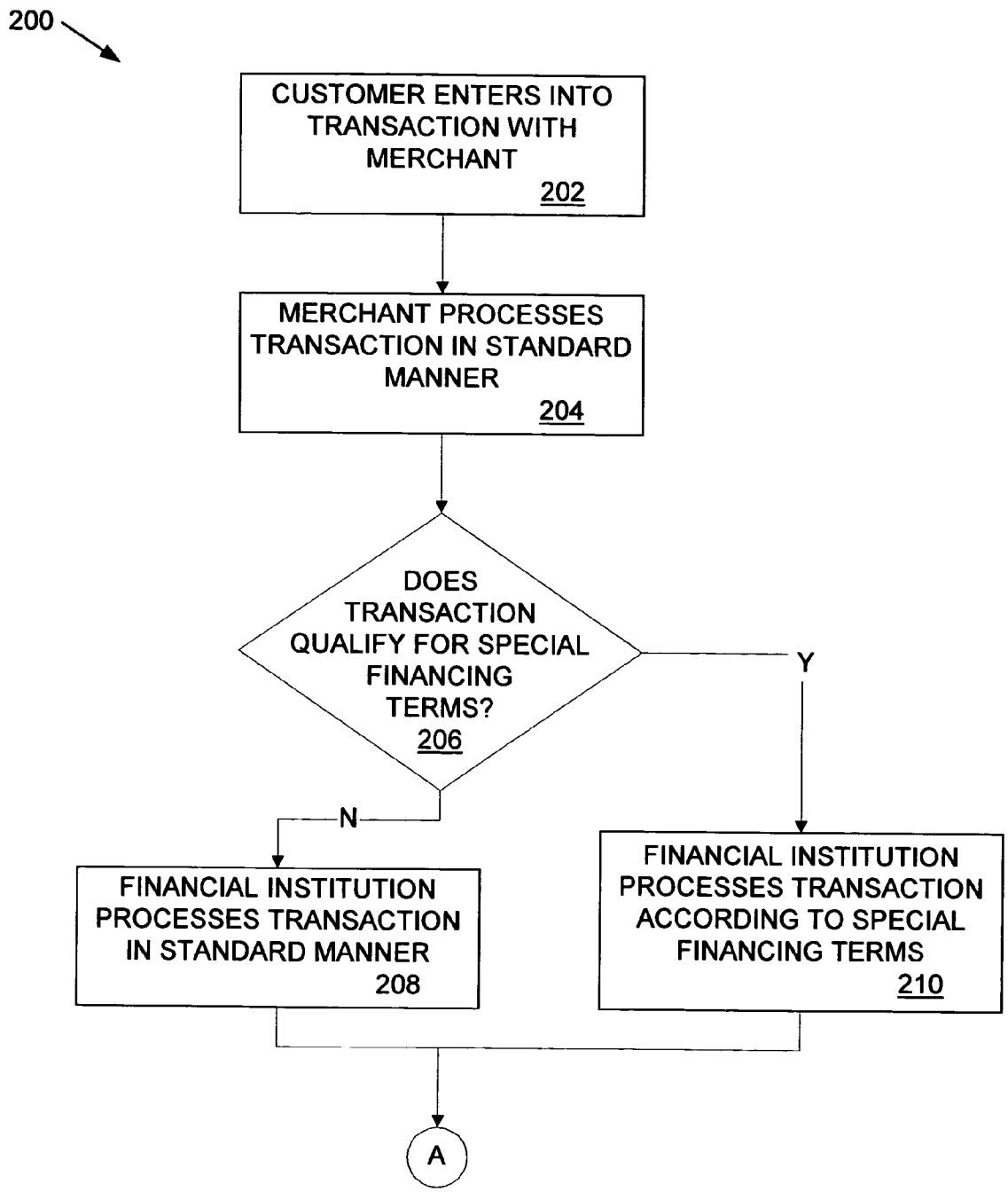
FIGS. 2 and 3 are a flowchart of an exemplary automated financial transaction process for transactions with differing financial payment terms performed over the network of FIG. 1.
Figure 3:
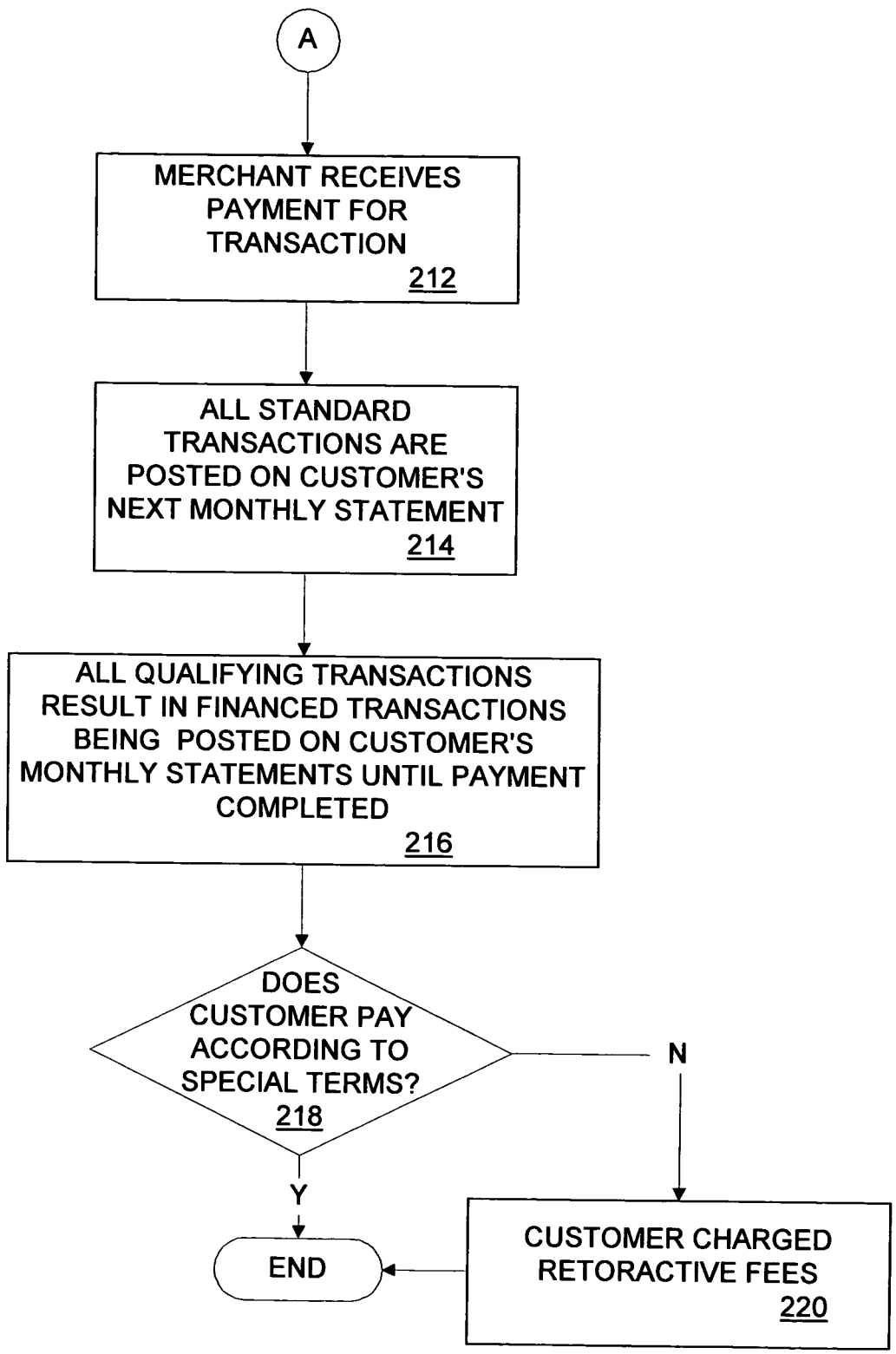

Referring now to FIGS. 1-3, wherein similar components of the present disclosure are referenced in like manner, various embodiments of a method and system for processing financial transactions subject to different financing terms are disclosed.

The network 100 may be any known type of financial transaction network over which credit transactions are currently completed. Such systems typically include a credit provider's server 102, that intercommunicates financial transaction and related data with a plurality of merchant servers 104, either directly or through a third party payment processing server 106 (examples of which are well known in the art). For sake of brevity, the processes disclosed herein will be discussed in the context of the network 100 shown. However, other configurations of the financial transaction network 100, including any existing financial transaction networks and the hardware associated therewith, may readily be employed.

Referring now to FIG. 2, therein is depicted an exemplary financial transaction process 200 performed between a merchant and a credit provider (or other financial institution) over the financial transaction network 100. The following descriptions of the process 200 presuppose that the credit provider has instituted a credit program in which transactions at or above a minimum threshold value (i.e. $1000.00) undertaken by enrolled customers with participating merchants may be subject to reduced (i.e., lower) financing terms as compared to standard financing terms applied to other transactions.

In certain embodiments, merchants may be enrolled in the credit program introduced herein upon their request, which may be communicated to the credit provider in any standard matter. Alternatively, or in addition thereto, merchants may be offered participation in the credit program as a group or automatically enrolled by the credit provider according to their industry type or industrial code (such as a Standard Industrial Classification (SIC) code or the like). A selection of appropriate industries to which the credit program is applied by the credit provider may be based on those industries where larger purchases are required, including, but not limited to: home improvements, personal computer equipment purchases, recreation, vacation packages, and the like. The credit program may also be offered or assigned to merchants that do not have their own house cards or similar programs. Merchants may also be provided with various other incentives to participate in the credit program. In various embodiments, merchants may or may not be notified of their participation Customers may be enrolled in the credit program introduced herein by submitting a request to the credit provider, or in response to an offer presented by the credit provider. Customer enrollment may be conditioned upon being approved by the credit provider, and such approval may be based on the customer's credit history, purchasing patterns, credit risk factors and the like. In various embodiments of the disclosed credit program, enrolled customers may be updated or periodically notified about merchants with whom qualified purchases may be undertaken and the minimum purchase amounts required, which may vary from merchant to merchant. Customers may also be notified of the repayment terms necessary for receiving reduced financing, such as repayment of the balance in full at 0% APR if paid within, for example, six months (or other period that is longer than a standard invoicing period for the credit provider). The reduced financing terms offered may alternatively require the repayment of equal installments of the transaction amount without interest (or at reduced interest) over the requisite repayment period. In one example, an invoicing period may be one month for standard transactions and the repayment period under the credit program may be three months or longer.

Other periods of time for invoicing and repayment may likewise be used, including providing a range of available repayment dates and allowing the customer to select a desired repayment date from that range. In various embodiments, the repayment date may be changed by the purchaser, even after their initial selection or assignment of a repayment term or completion of a purchase. In various embodiments, the purchaser may choose to extend the repayment period to a latter date during the commenced repayment term. Fees may be charged for any desired changes in the repayment term, and may be based on whether the requested change applies to a previous transaction and/or the length of the extension of the repayment period requested by the purchaser.

The credit programs contemplated herein may include any of a variety of minimum purchase amounts and various repayment terms, other than the examples provided above, without departing from the spirit and scope of the present disclosure. For instance, it is readily contemplated that the credit program's minimum spend threshold may be selectable by customers and/or merchants participating in the program, subject to approval by the credit provider. In one example, a customer may receive a longer repayment term for selecting a higher threshold minimum spend value.

The exemplary process 200 commences when a customer enters into a financial transaction, such as a credit card payment transaction, with a merchant (step 202). The merchant then processes the credit transaction in a standard manner (step 204) and receives an approval from the credit provider when appropriate. In various embodiments, for example, the approval may only be provided when the customer's account is in good standing.

Next, at step 206, the credit provider server determines whether the transaction qualifies for reduced financing terms according to an established credit program as described herein. The determination may be based on (1) the amount of the transaction compared to a minimum spend threshold of the credit program (i.e., $1000.00, or other amounts that may be higher than average consumer credit transaction amounts); (2) whether the customer is enrolled in the credit program; and (3) whether the merchant is enrolled in the credit program. Additional factors may also be applied.

In various embodiments, the determinations are made in step 206 without introducing any substantial delay in the standard time it take to approve a transaction. This may be done, for example, by making such determinations after the approval process in the initiated transaction, rather than concurrently therewith, such as at the time of billing statement generation. The introduction of any delay in standard approval times may deter customers or merchants from participation in the credit program, and so are best avoided.

If any of the requirements of the credit program are not satisfied at step 206 above, the process 200 continues to step 208 below. If, however, all the requirements for the transaction are satisfied, the process 200 instead continues to step 210, described later below.

From step 206 above, when the transaction is not qualified, the credit provider processes the transaction in a standard manner (step 208). That is, upon confirmation of completion of the approved transaction between the merchant and the customer, the credit provider charges the transaction to the customer's credit account according to standard financing terms for the account.

From step 206 above, when the transaction is instead a qualified transaction under the credit program, the credit provider processes the transaction according to the reduced financing terms (step 210), examples of which were previously described.

From either 208 or 210 above, the credit provider transmits payment for the transaction to the merchant (step 212). In various embodiments, the payment occurs in the same manner for both standard and qualified transactions. Substantial differences in payment times between processes might deter merchants from enrolling in the credit program, particularly if the payment process is more complex or lengthy for qualified transactions. Accordingly, it may be best to process payments to merchants in the same manner for standard and qualified transactions. However, in certain embodiments, payment terms for qualified transactions may be made more beneficial for qualified transactions (for example, by charging lower transaction fees or a lowered discount rate to the merchant) in order to encourage merchant to enroll in the credit program.

The process 200 then continues to step 214, where all standard transactions initiated by the customer are listed on the customer's next monthly invoicing statement. The standard transactions may be listed with a standard repayment due date and standard financing terms for repayment.

At step 216, all qualified transactions are listed on the billing statement as well with the reduced financing terms and a repayment due date for the balance of the qualified transaction, which is preferably later than the standard repayment due date above. In certain embodiments, the minimum payment due listed on any generated billing statement may include the current installment payment due for the qualified transaction. The billing statement with the standard and qualified transactions are then sent to the customer for payment.

At step 218, the credit provider monitors customer repayments to determine whether the customer has repaid the balance of the qualified transactions in accordance with the reduced financing and repayment terms. If requisite repayment of the qualified transaction is timely made by the customer, the process 200 ends. If, however, the customer fails to repay qualified transaction according to the reduced financing terms, then the customer may be charged a penalty (step 220), after which the process 200 ends. The penalty may include disenrollment from the credit program, as well as charging additional fees to the purchaser. Such additional fees may include retroactively charging the standard financing rate for the unpaid balance or the entire amount of any qualified transactions for the time that the transaction remains outstanding, or charging a rate higher than the standard financing rate.

A credit provider implementing the processes disclosed herein may provide flexibility to its customers in making large purchases which can be repaid over a period of time under reduced financing terms. By implementing such processes, a credit provider may expect increased charge volume previously lost to house cards and the like that offer similar terms, and a corresponding increase in revenue from additional transaction fees generated thereby. Merchants that do not have house card programs can benefit simply by enrolling with such credit provider and may continue to process financial transactions without any change in the way they have previously been accomplished. Customers benefit from receiving favorable financing terms on qualified purchases at a wide variety of merchants without obtaining numerous house cards.

In the case of non-credit account transactions (i.e., those involving accounts with positive currency balances and that may take place using a debit card or the like), the credit program introduced herein may be modified from the descriptions above to allow installment payments to be withdrawn from the non-credit account in equal increments over the repayment period, in place of a single withdrawal for the full amount the financial transaction as has been previously performed for such transactions.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A nontransitory computer-readable medium having computer program code recorded thereon that, when executed by a processor, causes the processor to perform operations comprising:

receiving information from a merchant, wherein the information corresponds to a financial transaction between a purchaser and a merchant, wherein the purchaser uses a payment vehicle authorized by a transaction account provider;

determining if the financial transaction is qualified for adjusted financing terms, based on receiving or accessing an amount of the financial transaction, status of enrollment by the merchant and an enrollment status of the purchaser;

charging the purchaser, using a single billing statement generated by the transaction account provider, for the financial transaction according to standard financing terms in response to the determination that the financial transaction is not qualified for the adjusted financing terms;

charging the purchaser, using the single billing statement generated by the transaction account provider, for the financial transaction according to the adjusted financing terms in response to the determination that the financial transaction is qualified for the adjusted financing terms;

using only one single network, and a same set of components within the only one single network, to complete processing of a payment for the financial transaction from the transaction account provider to the merchant for a standard financial transaction and a qualified financial transaction; and transmitting the payment to the merchant.

2. The computer-readable medium of claim 1, the payment vehicle comprising one of a charge card, a credit card, a credit account, a line of credit, an account transponder, an electronic payment, a convenience check, and a debit card.

3. The computer-readable medium of claim 2, wherein the payment vehicle is accepted by a plurality of merchants in a plurality of industries.

4. The computer-readable medium of claim 1, wherein the amount of the financial transaction must be at least equal to a threshold value in order for the financial transaction to qualify for the adjusted financing terms.

5. The computer-readable medium of claim 1, wherein the enrollment status of the merchant is based on an industry code associated with the merchant.

6. The computer-readable medium of claim 1, wherein the enrollment status of the purchaser is based on a credit history of the purchaser and an approved request from the purchaser to participate in the qualified purchasing transaction.

7. The computer-readable medium of claim 1, the standard financing terms comprising a zero percent interest charge if the amount of the financial transaction is repaid by the purchaser within a single invoicing period, and further comprising an annual percentage interest rate from 1% to 25% of the amount of the financial transaction if the amount is not repaid by the purchaser within the single invoicing period.

8. The computer-readable medium of claim 1, the adjusted financing terms comprising a zero percent interest charge on the amount of the financial transaction conditioned on full repayment of the amount within a period of time that is greater than one invoicing period.

9. The computer-readable medium of claim 8, wherein the invoicing period is equal to one month and the period of time for repayment is at least equal to three months.

10. The computer-readable medium of claim 8, further comprising:

retroactively charging the purchaser for the financial transaction according to the standard financing terms if the amount of the financial transaction is not repaid within the period of time by the purchaser.

11. The computer-readable medium of claim 1, further comprising:

processing the standard financial transaction according to the standard financial terms.

12. The computer-readable medium of claim 1, further comprising:

approving the standard financial transaction and the qualified financial transaction for the purchaser in a same invoicing period; and generating a billing statement including the standard financial transaction charged according to the standard financial terms and the qualified financial transaction charged according to the reduced financial terms.

13. The computer-readable medium of claim 1, further comprising charging an adjusted discount rate to an enrolled merchant for the qualified transaction, the adjusted discount rate being less than a standard discount rate applied to the standard transaction.

14. The computer-readable medium of claim 1, further comprising:

receiving a selection of a repayment period for the qualified transaction from the purchaser, wherein the adjusted financing terms are applied if the amount of the financial transaction is repaid by the purchaser within the selected repayment period.

15. The computer-readable medium of claim 14, further comprising:

charging a fee to the purchaser for the selection of the repayment period.

16. The computer-readable medium of claim 14, wherein the selection of the repayment period is received after an approval of the financial transaction.

17. The computer-readable medium of claim 1, further comprising:

charging the purchaser a fee related to the enrollment status of the purchaser.

18. A non-transitory computer readable medium having computer program code recorded thereon that, when executed by a processor, causes the processor to perform a method, the method comprising:

approving a received standard financial transaction initiated by a qualified purchaser with an unenrolled merchant;

approving a received qualified financial transaction that is financed at adjusted financial terms compared to the standard financial transaction, which is initiated by the qualified purchaser with an enrolled merchant;

using only one single network, and a same set of components within the only one single network, to complete processing of a first payment from a transaction account provider to the enrolled merchant for the qualified financial transaction and a second payment from the transaction account provider to the unenrolled merchant for the standard financial transaction; and transmitting, from the transaction account provider, both the first payment to the enrolled merchant and the second payment to the unenrolled merchant.

19. The computer-readable medium of claim 18, standard financial terms for the standard financial transaction comprising a zero percent interest charge if an amount of the standard financial transaction is repaid by the purchaser within a single invoicing period, and further comprising an annual percentage interest rate from 1% to 25% of the amount of the standard financial transaction if the amount is not repaid by the purchaser within the single invoicing period.

20. The computer-readable medium of claim 18, the adjusted financial terms comprising a zero percent interest charge on an amount of the qualified financial transaction conditioned on repayment of the amount within a period of time that is greater than one invoicing period.

21. The computer-readable medium of claim 20, further comprising:

retroactively charging the purchaser for the qualified financial transaction according to standard financing terms if the amount of the qualified financial transaction is not repaid within the period of time by the purchaser.

22. A nontransitory computer-readable medium having computer program code recorded thereon that, when executed by a processor, causes the processor to perform a method, the method comprising:

receiving, from a merchant, a request to complete a financial transaction, using a payment vehicle authorized by a transaction account provider, with a purchaser;

transmitting an approval of the financial transaction to the merchant;

determining whether the financial transaction is a qualified financial transaction based on accessing or receiving an amount of the financial transaction, status of enrollment by the merchant and an enrollment status of the purchaser;

billing the purchaser, using a single billing statement generated by the transaction account provider, for the financial transaction according to reduced financing terms when the financial transaction is the qualified financial transaction and the purchaser is an enrolled purchaser;

billing the purchaser, using the single billing statement generated by the transaction account provider, for the financial transaction according to standard financing terms when either the financial transaction is not the qualified purchasing transaction or the purchaser is not a qualified purchaser;

using only one single network, and a same set of components within the only one single network, to complete processing of a settlement payment for the financial transaction from the transaction account provider to the merchant for the standard transaction and the qualified transaction; and transmitting the payment from the transaction account provider to the merchant based on the amount of the financial transaction, wherein the payment from the transaction account provider to the merchant is processed the same for the standard financial transaction and the qualified financial transaction.

23. A method, comprising:

receiving information corresponding to a financial transaction between a purchaser and a merchant using a payment vehicle authorized by a transaction account provider and a merchant, including a transaction amount due to the merchant for the financial transaction;

storing, on a computer server, said financial transaction information; electronically matching, using a processing device, the merchant to information stored on the computer server corresponding to merchant enrollment status;

electronically matching, using the processing device, the purchaser to information stored on the computer server corresponding to purchaser enrollment status;

electronically generating, using the processing device, a financial terms indicator, based on said matched enrollment status of the merchant and said matched enrollment status of the purchaser, from said stored financial transaction data, the indicator being either standard or qualified;

charging the purchaser, using a single billing statement generated by the transaction account provider, for the financial transaction according to financing terms corresponding to said financial terms indicator;

using only one single network, and a same set of components within the only one single network, to complete processing, of a payment from the transaction account provider to the merchant for the financial transaction, for a standard financial transaction and a qualified financial transaction; and transmitting the payment to the merchant.

* * * * *